(12) United States Patent
Rane et al.

(10) Patent No.: US 8,750,508 B2
(45) Date of Patent: Jun. 10, 2014

(54) METHOD FOR OUTSOURCING DATA FOR SECURE PROCESSING BY UNTRUSTED THIRD PARTIES

(75) Inventors: Shantanu Rane, Cambridge, MA (US); Wei Sun, Kitchener (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/525,218

(22) Filed: Jun. 15, 2012

(65) Prior Publication Data

US 2013/0340098 A1    Dec. 19, 2013

(51) Int. Cl.
*G06F 21/00*      (2013.01)

(52) U.S. Cl.
USPC .......................................... 380/265; 705/75

(58) Field of Classification Search
USPC ........................................... 380/265; 705/75
See application file for complete search history.

(56) References Cited

U.S. PATENT DOCUMENTS

| 2006/0253375 | A1* | 11/2006 | Adcock et al. ................. 705/37 |
| 2009/0177591 | A1* | 7/2009 | Thorpe et al. ............... 705/36 R |
| 2012/0151359 | A1 | 6/2012 | Mysen |
| 2012/0204026 | A1 | 8/2012 | Shi |

OTHER PUBLICATIONS

Vaidya, Jaideep, and Chris Clifton. "Privacy preserving association rule mining in vertically partitioned data." Proceedings of the eighth ACM SIGKDD international conference on Knowledge discovery and data mining. ACM, 2002.*

* cited by examiner

*Primary Examiner* — Kambiz Zand
*Assistant Examiner* — Michael Guirguis
(74) *Attorney, Agent, or Firm* — Dirk Brinkman; Gene Vinokur

(57) ABSTRACT

Data is generated in a client based on events at a client, wherein each event is associated with a first dimension, a second dimension and a quantity. A random value is generated for each interval of the first dimension and each instance of the second dimension. The quantity of each event is modified using the random value to determine a modified quantity. A running total for each interval of the first dimension and each instance of the second dimension is determined using the modified quantities and transmitted to an untrusted third party. An exact result of processing the modified quantities and the running totals by the untrusted third party can then be received and decoded by the client.

7 Claims, 8 Drawing Sheets

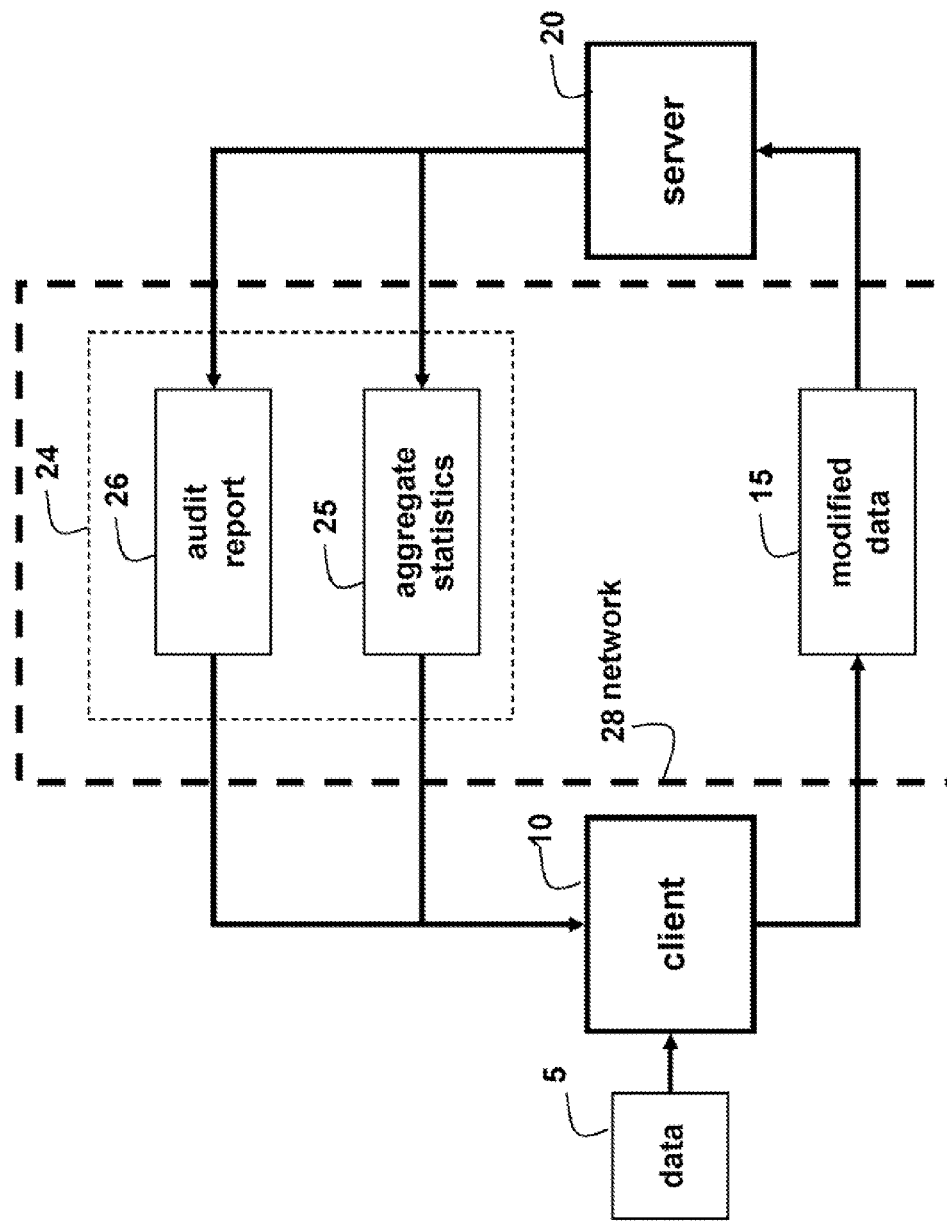

| time | event/trader | quantity shares (100s) |
|---|---|---|
| 10:14 am | Bob | 7 |
| 10:19 am | Alice | 12 |
| 10:42 am | David | 9 |
| 11:05 am | Charlie | 5 |
| 11:19 am | David | 9 |
| 11:38 am | Bob | 1 |
| 11:59 am | David | 4 |
| 12:12 pm | Bob | 17 |
| 12:36 pm | David | 5 |
| 12:41 pm | Alice | 3 |
| 12:43 pm | Bob | 7 |
| 12:46 pm | Charlie | 6 |

*Fig. 1B*

| event/trader | 10-11 am | 11 am -noon | noon -1 pm | totals |
|---|---|---|---|---|
| Alice | 12 | 0 | 3 | 15 |
| Bob | 7 | 1 | 24 | 32 |
| Charlie | 0 | 5 | 6 | 11 |
| David | 9 | 13 | 5 | 27 |
| Totals | 28 | 19 | 38 | 85 |

*Fig. 2*

| time | trader | random value (in hundreds) |
|---|---|---|
| 10:14 am | Bob | 2 |
| 10:19 am | Alice | 24 |
| 10:42 am | David | 9 |
| *10:46 am* | *Charlie* | *13 (randomly inserted)* |
| 11:05 am | Charlie | 16 |
| 11:19 am | David | 11 |
| 11:38 am | Bob | 23 |
| *11:42 am* | *Alice* | *3 (randomly inserted)* |
| 11:59 am | David | 7 |
| 12:12 pm | Bob | 1 |
| 12:36 pm | David | 31 |
| 12:41 pm | Alice | 21 |
| 12:43 pm | Bob | 29 |
| 12:46 pm | Charlie | 6 |

*Fig. 3A*

| trader | random totals |
|---|---|
| Alice | 50 |
| Bob | 55 |
| Charlie | 35 |
| David | 58 |

*Fig. 3B*

| interval | random totals |
|---|---|
| 10 am – 11 am | 48 |
| 11 am – 12 noon | 60 |
| 12 noon – 1 pm | 88 |

*Fig. 3C*

| time | trader | modified quantity |
|---|---|---|
| 10:14 am | $%? | 9 |
| 10:19 am | (*&!@ | 36 |
| 10:42 am | !#{^< | 18 |
| 10:46 am | ^%(*@ | 13 |
| 11:05 am | ^%(*@ | 21 |
| 11:19 am | !#{^< | 20 |
| 11:38 am | $%? | 24 |
| 11:42 am | (*&!@ | 3 |
| 11:59 am | !#{^< | 11 |
| 12:12 pm | $%? | 18 |
| 12:36 pm | !#{^< | 36 |
| 12:41 pm | (*&!@ | 24 |
| 12:43 pm | $%? | 36 |
| 12:46 pm | ^%(*@ | 12 |

*Fig. 4A*

| trader | random totals |
|---|---|
| (*&!@ | 48 |
| $%? | 9 |
| ^%(*@ | 35 |
| !#{^< | 58 |

*Fig. 4B*

| interval | random totals |
|---|---|
| 10 am – 11 am | 48 |
| 11 am – 12 noon | 60 |
| 12 noon – 1 pm | 78 |

*Fig. 4C*

|  | 10 am -11 am | 11 am -12 noon | 12 noon - 1 pm | subtract random totals per trader | exact aggregate statistics |
|---|---|---|---|---|---|
| (*&!@ | 36 | 3 | 24 | -48 | 15 |
| $%? | 9 | 24 | 54 | -55 | 32 |
| ^%(*@ | 13 | 21 | 12 | -35 | 11 |
| !#{^< | 18 | 31 | 36 | -58 | 27 |
| subtract random totals per time interval | -48 | -60 | -88 | X |  |
| totals | 28 | 19 | 38 |  | 85 |

*Fig. 5*

METHOD FOR OUTSOURCING DATA FOR SECURE PROCESSING BY UNTRUSTED THIRD PARTIES

FIELD OF THE INVENTION

This invention relates generally to outsourcing data, and more particularly to processing the data by an untrusted third party, wherein the processing includes determining aggregating statistics on the data and audit reports on the data.

BACKGROUND OF THE INVENTION

Privacy Preserving Storage

When data are outsourced by a client to a server for storage, it is often desirable to "hide" the individual data entries from the server in a secure manner. In other words, the server is an untrusted third party, and the data is not revealed to the server.

The reason for this is to preserve privacy of client information, and to prevent the server to gain access to sensitive information about processes used to acquire and generate the data. For these reasons, the data are often modified in a secure manner before outsourcing to the server.

Another reason for "hiding" the individual data entries is to allow the server, or any untrusted party accessing the server to compute aggregate measures (such as mean, variance, or other moments) from the data without revealing individual data. In this way, remote "global" data analysis can be enabled while preserving privacy of sensitive data.

Random Number Generation

One information theoretically secure way to hide the data adds random values drawn from a probability distribution to the data. For number data, for example, privacy can be obtained by masking the data using numbers sampled from a uniform distribution. The numbers can be sampled using a Cryptographically Secure Pseudorandom Number Generator (CS-PRNG). The CS-PRNG uses a seed to generate a pseudorandom sequence of bits, which, in turn, can be used to generate numbers from a desired probability distribution. Typically, the numbers are integers.

CS-PRNG is preferred over PRNG because of two beneficial properties.

(1) Given any bit output by the CS-PRNG, it is impossible to predict a next bit in polynomial time with probability greater than 0.5.
(2) If the CS-PRNG is compromised at any time, it is impossible to reconstruct the sequence bits generated before that time.

Aggregate Statistics

Even though the data are hidden from the server, it is often beneficial to enable the server to determine aggregate statistics that provide summary information about portions of the data. For example, it may be desired to determine a number of pages printed on a given printer on a given day. As another example, it may be desired to determine a total number of "trades" that are performed by a trader during a given time interval.

Common aggregate statistics include sum, weighted sum, average, weighted average, higher moments, weighted higher moments, etc. Techniques such as randomized response hide individual data but allow determination of estimates of aggregate statistics on the data. Randomized response is one method that allows respondents to respond to sensitive issues while maintaining confidentiality of the response.

The straightforward method for implementing randomized response is to additively mask individual data entries using random numbers before transmitting the data entries to the server. By carefully tuning the distribution of the masking values, this allows the storage server to determine an estimate of the aggregate statistic. However, enabling the server to compute the exact aggregate statistic while hiding individual data entries is very difficult, especially when the client side can only perform limited or no buffering of the data when the data are produced.

Audits

From time to time, the client may want to conduct audits on portions of the data stored at the server. An audit refers to recovering a portion of the stored data, and verifying the integrity of the data. This information is typically contained in an audit report. To generate the audit report, the client requests some of the modified data from the server. In order to be able to interpret the audit report, the modified data in the report should be perfectly reversible by the client.

SUMMARY

Embodiments of the invention provide a method for processing data securely by an untrusted third party. The method uses a cryptographically secure pseudorandom number generator.

The embodiments provide a method that enables client data to be outsourced to an untrusted server to produce results. The results can include exact aggregate statistics and on the data, and an audit report on the data. In both cases, the server processes modified data to produce exact results, while the underlying data and results are not revealed to the server.

BRIEF DESCRIPTION OF THE DRAWINGS

FIG. 1A is a block diagram of a system according to embodiments of the invention;

FIG. 1B is a table of example events on which embodiments of the invention operate;

FIG. 2 is a table of aggregate statistics for the example events of FIG. 1B;

FIGS. 3A-3C and 4A-4C are tables of modified data related to the events of FIG. 1B;

DETAILED DESCRIPTION OF THE PREFERRED EMBODIMENTS

Figure 6:
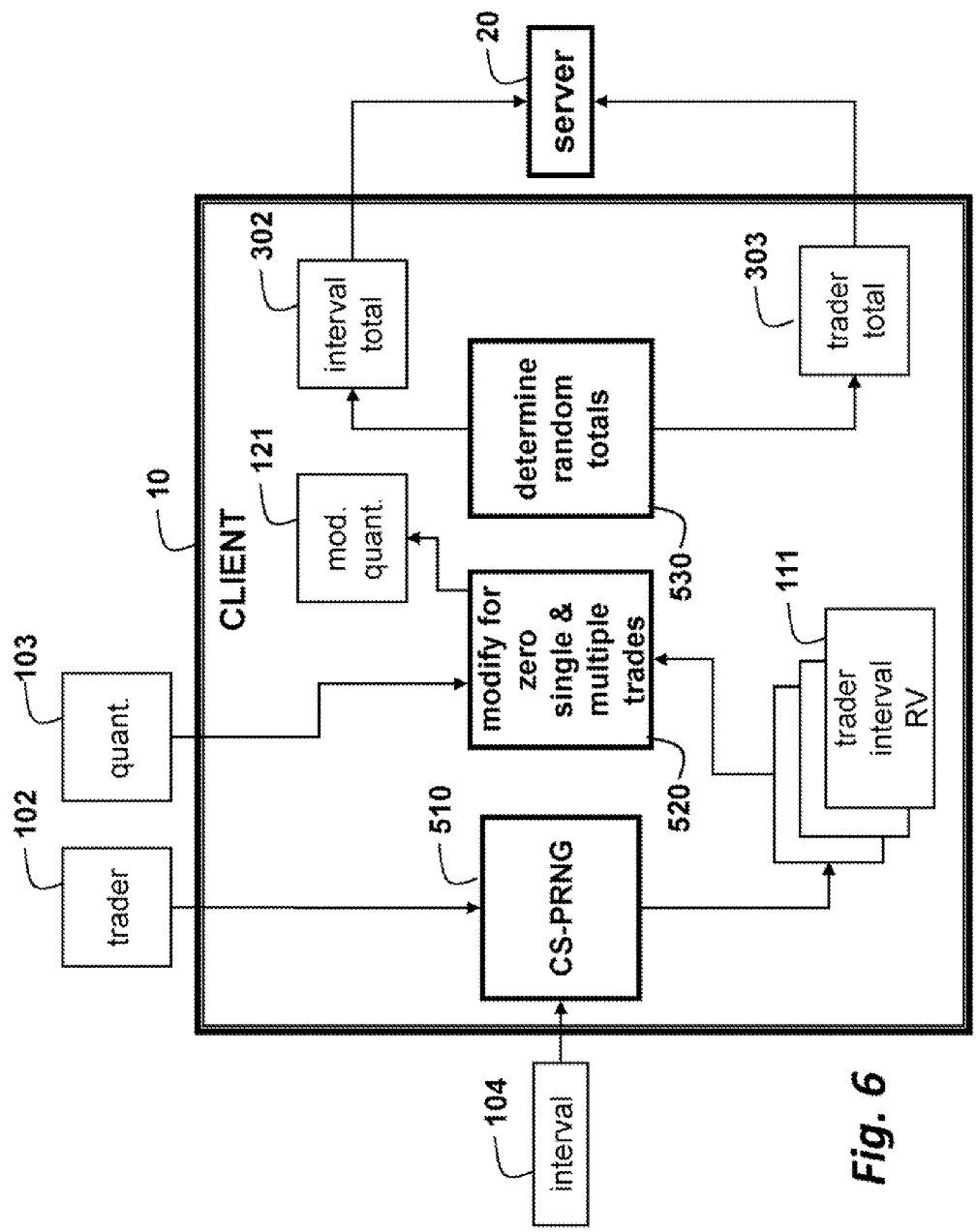
FIG. 6 is a flow diagram of a method for modifying data at a client according to embodiments of the invention to produce exact aggregate statistics on the data.

Embodiments of the invention provide a method for processing data 5 generated by a client 10 at a server 20 to produce a result 24. The server is assumed to be an untrusted third party. The result can be exact aggregate statistics 25 on the data, or an exact audit report 26 on the data. The client and server are connected by a network 28.

The client modifies the data in such a way that exact aggregate statistics 25 on the data can be determine by the server, even though the data are not revealed to the server. Generally, the data are related to events. Each event has an associated first dimension, second dimension, and quantity. The client and the server have processors connected to memory and input/output interfaces to perform steps of the method.

As shown in FIG. 1A, the embodiments are described for a financial application. In this example, the events are trades, the first dimension is time, the second dimension is names of traders, and the quantities are shares. It is understood that the invention can be used for any type of data.

For example, in a retail environment, the events can be sales of items, the first dimension the type of item, the second dimension the seller or buyer name, and the quantity is the number of items.

In a survey application, the first dimension can be a specify response type, the second dimension a respondent, and the quantity the response value, e.g., average income.

It should be understood that the data can include additional dimensions.

In the financial application, the data include the quantity of shares 103 traded at times (first dimension) 101 by individual traders (second dimension) 102. The first column indicates the time of the trade. The second column names the trader executing the trade, and the third column the quantity of shares traded (in hundreds) of shares. The data are generated at the client in real time.

It is desired to aggregate exact statistics for hourly time intervals 104, i.e., the first dimension. Furthermore, it is desired that the data are transmitted to the server, and stored at the server in real time, so that loss of data to a system failure is minimized, and up-to-date results are available at any time.

When an event occurs, a row is added to the table of FIG. 1B in real time. An object of the invention is to modify the data in a privacy-preserving manner, and to transmit the data to the server for storage in real time. It is also an object to enable the server to determine exact aggregate statistics on the modified data when requested by the client, and for the client to audit the data stored at the server by requesting the audit report at any time.

FIG. 2 shows an example of aggregate statistics in raw (unencrypted) data form, i.e., the total quantity of shares traded 201 during the hourly intervals by the traders. Other statistics are possible, e.g., sum, weighted sum, average, weighted average, higher moments, weighted higher moments, etc.

If all the data are outsourced, then it becomes difficult for the client to determine the aggregate statistics on the data. It may also be impossible for the server to perform this task if the all the data are modified securely in a conventional manner.

FIGS. 3A-3C, 4A-4C and 5 show how the data can be modified using the following steps according to embodiments of the invention.

Figure 7:
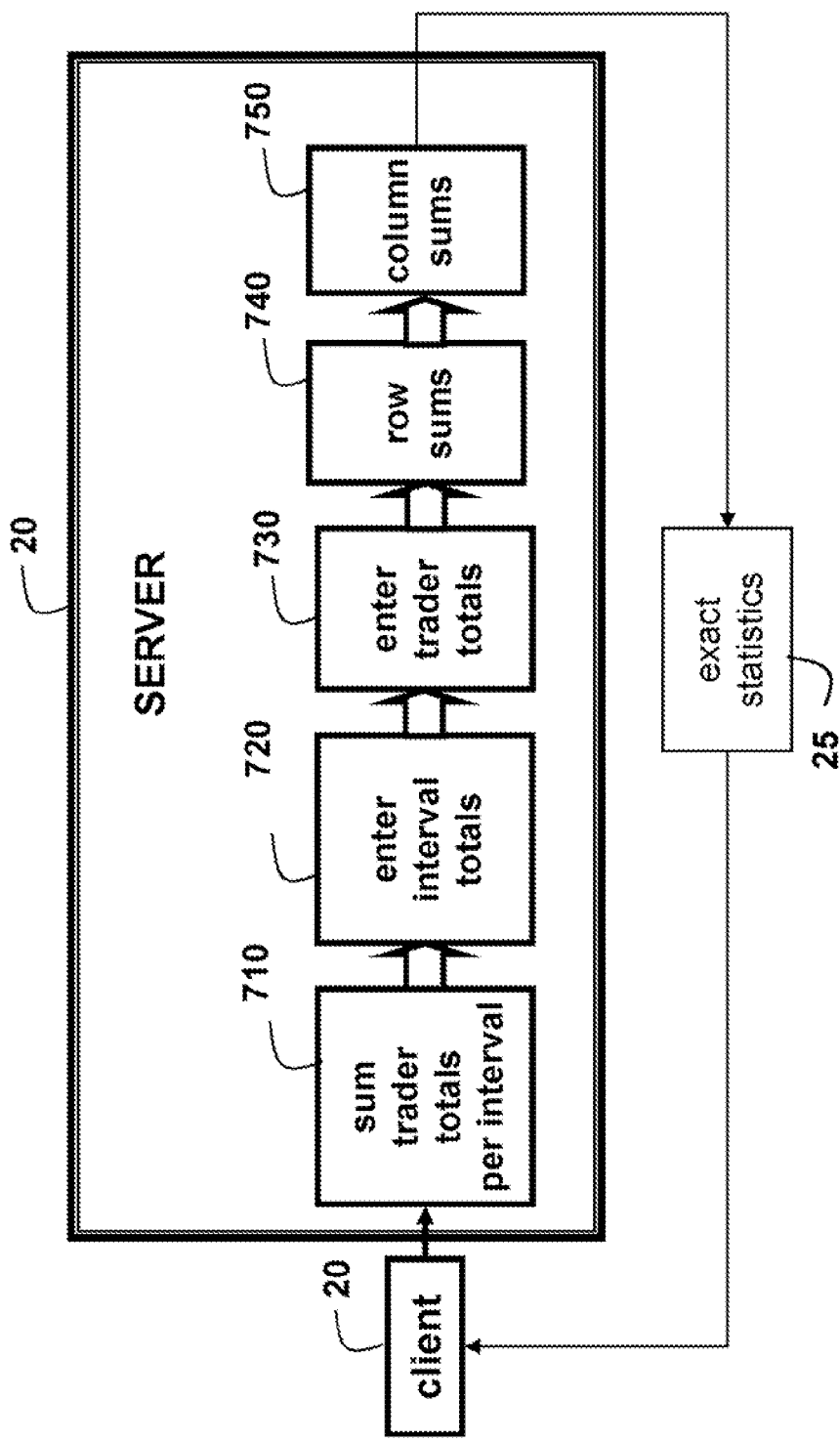
FIG. 7 is a flow diagram of a method for generating an audit report on client data stored at a server according to embodiments of the invention.

FIG. 6 shows the general method for processing data by the client according to embodiments of the invention, and FIG. 7 shows the method used by the server.

Method Steps

In this example, the first dimension is the time interval, and the interval of interest is one hour. It should be understood that other time intervals can be used alone, or concurrently. The steps of the method can be performed in processors connected memories and input/output interfaces as known in the art. There can be one processor at the client, and another at the server. The client and server can communicate with each other using a network 28 as know in the art.

Generate Random Value 6.1. As shown in FIGS. 3A and 6-7, at the beginning of each 1-hour time interval, a Cryptographically Secure Pseudo-Random Number Generator (CS-PRNG) is used to generate 510 at least one random value (RV) 111 for each trader. Because the example is concerned with the quantity of shares, the random value is a non-negative integer number. In other words, there is a random for each instance of the first dimension (time interval) and the associated second dimension (trader).

In one embodiment, the random value is a uniformly distributed between 0 and X, where X is a large integer. If the maximum quantity of shares traded in any day is 5000, then the X=5000/100=50. It is understood that the random values can be other numeric or non-numeric values.

Modify Quantity

Single Trade 6.2A. When trader Bob trades seven shares at 10:14, shown in FIG. 1B, the random value 111 for that trader and interval is added 520 the quantity 103 of shares traded, e.g., 2 as shown in FIG. 3A, to give a modified quantity 121 of shares traded, e.g., 9 as shown in FIG. 4A.

No Trades 6.2B. If a given trader does not perform a trade in a particular 1-hour interval, then select the time 101 at random, and enter the random value 111 as the modified quantity of shares traded to insert a random entry 301 for that trader in the table for that interval. For example, Charlie does not perform any trades from 10-11 am. The random value generated for him is 13. The time is selected at random in the 1 hour interval, e.g., 10:46 in FIG. 3A and the random value of 13 is used as the modified quantity of shares in FIG. 4A.

Multiple Trades:

6.2C. If a trader performs more than one trade during the 1-hour interval, use the CS-PRNG to generate a new random value for that trader as in Step 1 and determine the modified quantity of shares as in Step 2. For e.g., David performs two trades between 11-12, 9 shares at 11:19 am and 4 shares at 11:59 am. In this case, the random value is generated for David at each of the two times, quantity 11 at time 11:19 am and quantity 7 at time 11:59 am, as shown in FIG. 3A. This is added to the true quantity of shares 103 to generate the modified quantity 111 of shares, which is 20 shares at 11:19 am and 11 shares at 11:59 am, as shown in FIG. 4A.

Totals

Interval 6.3A. A total 302 of the random values for each time intervals over all traders is determined 530 as shown in FIG. 3C. At the end of the time interval, transmit the total to the server. For example, adding all the random values for the 10-11 am time interval gives 48. Thus, at 11 am, the quantity 48 is sent to the server. This number can be used by the server to determine the exact aggregate statistics according to embodiments of the invention.

Trader 6.3B. A total 303 of the random values for each trader over all time intervals is determine 330 as shown in FIG. 3B. At the end of all time intervals, transmit the total to the server. For example, adding up all the random values for Alice gives 50. Thus at 1 pm, when all trading is completed, the number 50 is sent to the server. This number is used by the server to determine the exact aggregate statistics.

If it is desired to keep hide the trader names, the names are encrypted. For example, the names "Alice," "Bob," "Charlie," and "David" can be encrypted with a symmetric key cryptosystem, a public key cryptosystem, or anonymized as A*, B*, C*, D*, and so on.

At the end of the method, the server only has hidden (encrypted) data in the following sense: the trader names are hidden—if desired; and the quantity of shares traded at any time stamp, and therefore in any given time interval by any trader is hidden. As used herein, "hidden" means encrypted in a secure by the client so that the data are not revealed to the server, or anyone else—but for the client.

Determining Exact Aggregate Statistics from Hidden Data at the Server

As described above, the server stores the modified data in the form as shown in FIG. 4A. This enables the server to aggregate the exact statistics as shown in FIG. 5. The names and quantities are hidden from the server, but the aggregate statistics are exact.

FIG. 7 shows the method for aggregating the statistics at the server.
- (1) 7.1. For every hidden trader in FIG. 4A, sum 710 the modified quantity of trades 303 in each 1-hour interval, and enter in the table of FIG. 5.
- (2) 7.2. Enter 720 the random values for each time interval as a row in the table.
- (3) 7.3. Enter 730 the totals of the random values for the traders as column. in the table.
- (4) 7.4. Perform 740 row-wise summation to obtain the aggregate quantity of shares traded by each trader across all time-intervals.
- (5) 7.5. Perform 750 column-wise summation to obtain the aggregate quantity of shares traded in each time-interval across all traders.

When the server transmits the hidden (encrypted) exact aggregate statistics 25 to the client, the client can subtract the various random values to recover the exact aggregates as shown in FIG. 5. Similar reversible operations can be performed for the audit report.

Proof of Correctness

We now verify that the aggregate statistics using the modified quantities are exact, even though the quantities are randomized.

There are i traders in the first dimension and j time intervals in the second dimension. The original quantity of shares traded by trader i in the $k^{th}$ trade in time interval j is $x(i, j, k)$. The random value obtained from the CS-PRNG for trader i for the $k^{th}$ trade in time interval j is $n(i, j, k)$.

Then, the aggregate statistics of interest for k events are given by $$S(\text{trader } i) = \sum_{all\ j}\sum_{all\ k} x(i, j, k)$$

for each trader i; and $$S(\text{interval } j) = \sum_{all\ i}\sum_{all\ k} x(i, j, k)$$

for each time interval j

At the server, the values in FIG. 4A are $x(i, j, k)+n(i, j, k)$. The server also has the values in FIG. 3B, which are $$U_i = \sum_{all\ j}\sum_{all\ k} n(i, j, k)$$

for each trader i.

The server also has the values in FIG. 3C, which are $$T_j = \sum_{all\ i}\sum_{all\ k} n(i, j, k)$$

for each time interval j

To determine the aggregate statistics, the server performs the following steps.
1) The quantity of shares traded by a given trader across all time intervals is $$A(\text{trader } i) = \left[\sum_{all\ j}\sum_{all\ k} x(i, j, k) + n(i, j, k)\right] - U_i =$$

$$\sum_{all\ j}\sum_{all\ k} x(i, j, k) = S(\text{trader } i).$$

(2) 2. The quantity of shares traded during a given time interval across all traders is $$A(\text{interval } j) = \left[\sum_{all\ i}\sum_{all\ k} x(i, j, k) + n(i, j, k)\right] - T_j =$$

$$\sum_{all\ i}\sum_{all\ k} x(i, j, k) = S(\text{interval } j).$$

Extension to Weighted Statistics

The method can be extended to determine weighted aggregates of the form $$S(\text{trader } i) = \sum_{all\ j}\sum_{all\ k} a(i, j, k)x(i, j, k) \text{ for each trader } i; \text{ and}$$

$$S(\text{interval } j) = \sum_{all\ i}\sum_{all\ k} b(i, j, k)x(i, j, k) \text{ for each time interval } j,$$

where the weights $a(i, j, k)$ and $b(i, j, k)$ are known to the server.

The weighted aggregates are determined by modifying the way in which the values in FIG. 3B-3C are determined.

Specifically, instead of obtaining the values in FIG. 3B, or equivalently FIG. 4B using the relations for $U_i$ above, the determination uses $$U_i = \sum_{all\ j}\sum_{all\ k} a(i, j, k)n(i, j, k) \text{ for each trader } i.$$

Similarly, instead of obtaining the values in FIG. 3C, or equivalently FIG. 4C using the relations for $T_j$ above, the determination uses $$T_j = \sum_{all\ i}\sum_{all\ k} b(i, j, k)n(i, j, k) \text{ for each time interval } j,$$

and the proof of correctness is the same as before.

Advantages Over a Scheme with Zero-Summing Random Values

A method that may, at first, appear to be simpler selects the random values to be positive and negative such that the quantities in FIG. 3B are all zero. Thus, the random values for a given trader across all time intervals add up to zero, and the random values for a give time interval across all traders also add up to zero. As an advantage, the aggregate statistics are easy to determine by the server. If all the values in FIG. 3B-3C are zero, then it the quantity of shares traded by a trader in all time intervals is obtained by adding the modified quantity of shares for that trader in all time intervals. Furthermore, the quantity of shares traded in a given one-hour interval is obtained by summing the modified quantity of shares for all traders in that time interval.

However, the simpler method has the following disadvantages:
1. A negative random value may be undesirable and may leak information about the true value.
2. In order to ensure that the random values cancel out, it is necessary to wait until the end of a time interval to generate the random values, and real time processing is no longer possible, making that method vulnerable to system failures.

For example, if there is a trade at 10:15 am, and no other trades until 11:20 pm, then the client must wait for 45 minutes until 11:00 am to generate a random value for the 10:15 am trade that cancels out all the random values of all other traders in the 10-11 am time interval. This may not be desirable, especially if there is a loss of network connection between the client and the server, or a power loss in which information about the final trade could be lost. Therefore, it desired to transmit and process the information in real time as data become available.

It may seem that the random values could all be predetermined to satisfy the criteria that all random values for a given trader across all time intervals sum to zero, and all random values within a given time interval across all traders sum to zero. That assumes that the trades by a given trader in a given time interval is known a priori. However, in practice, there is no prior knowledge of the times and quantity of shares traded. Thus, generating a predetermined matrix of random values is impossible.

The invention is primarily concerned with keeping data entries in a database upon which aggregate measures are to be determined, secure from the server. Examples of these include quantity of shares traded, number of web pages accessed, number of occurrences of a certain word in an email, biometric data, and so on.

We can also hide textual information such as trader names, addresses, etc. using generalization, symmetric key encryption, and so on. These are included in the example embodiment for the sake of completeness.

Audits

The method described herein also enables the client to perform audits on the modified data stored at the server at any time. The audit may involve several types of check on the data. Herein, the audit refers to an operation that enables the client to retrieve a portion of the original data in an audit report, and to determine functions of the data as necessary.

To retrieve the portions of the original data, i.e., the quantities before modification, the client a key used to encrypt the trader names, addresses etc. During the audit, the client requests the server for the encrypted data for specified intervals, and then reverses the encryption to recover the trader names, addresses and other alphanumeric strings.

The main focus of this invention, however, is on the recovery of the data that was modified using the CS-PRNG before the data are sent to the server. Because the method described herein uses the CS-PRNG to hide each numerical value individually, it is possible to recover the original values as long as the client has the seed of the CS-PRNG, and the time corresponding to the numerical value desired.

To retrieve the original quantities, the client performs the following steps:
1. Retrieve some or all modified data from server in the audit report;
2. Rerun the CS-PRNG with the appropriate seed and state information to regenerate random values. Example of the state information is the time stamp corresponding to the data being audited; and
3. Subtract the random values from the modified data in the audit report to recover the original data.

Increased Security Using Encryption:

The above embodiment can be modified slightly to ensure that the storage server can compute only an additive share of the aggregate statistic, rather than the exact value of the aggregate statistic. This is accomplished by encrypting the values of $U_i$ and $T_j$ using any symmetric or asymmetric encryption scheme for which the decryption key is available only to the client. These encrypted values are stored at the server, but cannot be used by the server.

With this modification, the server can no longer compute the aggregate statistic because it cannot subtract the values of $U_i$ and $T_j$ from the running summations. This method ensures that the quantity computed by the server is an additive share of—and in general independent of—the true aggregate statistic.

To compute the true aggregate statistic, the server transmits the additive share to the client, and also transmits the encryptions of $U_i$ and $T_j$ to the client. The client then decrypts $U_i$ and $T_j$ computes the aggregate statistics given by A(trader i) and Z(trader j) as explained above.

EFFECT OF THE INVENTION

This invention is different from prior art methods in the sense that the server can determine the exact result, and not just an estimate or an approximation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for processing data generated based on events having a first dimension, a second dimension and a quantity, comprising:
   generating a random value for each interval of the first dimension and each instance of the second dimension;
   adding the random value to the quantity of each event to determine a modified quantity;
   determining a running total for each interval of the first dimension and each instance of the second dimension using the modified quantities;
   transmitting the modified quantities and the running totals to an untrusted third party; and
   receiving an exact result of processing the modified quantities and the running totals by the untrusted third party, wherein the steps are performed in real time by a client.

2. The method of claim 1, wherein the result includes aggregate statistics on the data.

3. The method of claim 1, wherein the result includes an audit report on the data.

4. The method of claim 1, wherein the untrusted third party is a server connected to the client by a network.

5. The method of claim 1, where in the random value is generated by a cryptographically secure pseudo-random number generator.

6. The method of claim 1, wherein data in the second dimension are encrypted.

7. The method of claim 1, wherein the aggregate statistics are weighted.

* * * * *